Figure 1:
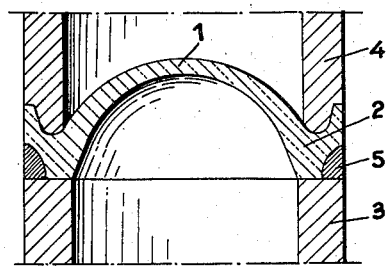

April 27, 1937.   L. C. BRISSON   2,078,835

RESILIENT WALL

Filed Feb. 11, 1936

Patented Apr. 27, 1937

2,078,835

UNITED STATES PATENT OFFICE 2,078,835

RESILIENT WALL

Louis Charles Brisson, Neuilly-sur-Seine, France, assignor to Société Anonyme Société des Freins Hydrauliques S. De Lavaud, Paris, France Application February 11, 1936, Serial No. 63,457
In France May 3, 1935

3 Claims. (Cl. 137—157)

This invention relates to the technics of resiliently distortable walls which, interposed between two enclosures of which they ensure the fluid-tight insulation, transmit variations of pressures between these two enclosures or cause the pressure of a fluid to vary in one of them. Such walls are particularly used in the hydraulic control of the brakes of motor vehicles. In this case, they are in the shape of rubber caps the edges of which are clamped between two annular members. In order to efficiently hold the wall, the edges of the latter are inserted, to an appreciable extent, between the clamping members, so that the mass of rubber thus held is important relatively to the mass of the free wall.

If an inc ease of temperature occurs, the rubber expands to a much greater extent than the metal clamping members, since its coefficient of expansion is about fourteen times that of steel. The molecules of gum of the clamped portion flow outwardly in the free portion of the wall and, when the temperature lowers, the pressure exerted on the clamped portion prevents their return into the clamping zone. Upon each appreciable increase of temperature, a transfer of the clamped gum towards the free gum thus occurs and the wall distorts and gradually gets loose.

The object of the invention is to remedy this serious inconvenience and mainly consists in substituting for a portion of the rubber mass constituting the edge of the wall subjected to the clamping action, a material having a very low coefficient of expansion relatively to rubber and intimately associated with the latter, so as to reduce as much as possible the volume of rubber subjected to the clamping action.

Thus defined in its principle, the invention lends itself to multiple embodiments which can differ from each other particularly by the nature of the material having a low coefficient of expansion and the mode of binding said material to the gum.

Among these embodiments, the following, which for the moment appear to be particularly advantageous, will be indicated:

1. A portion of the mass of rubber subjected to the clamping action is covered with cloth or canvas.

2. A ring made of a material having a low coefficient of expansion, and having a cross section devised for presenting an appreciable surface of contact with the rubber, is introduced before moulding the wall and vulcanized with the latter.

3. A steel ring is substituted for the greater portion of the edge subjected to the clamping action and adheres to the gum by a surface covered with a layer of brass, or by any other adhesion process.

The accompanying drawing illustrates, by way of example only, forms of construction of improved rubber caps according to the invention.

Figure 2:
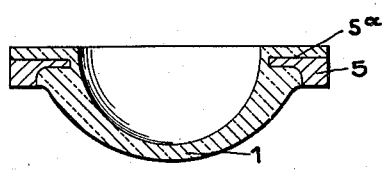
Figure 3:
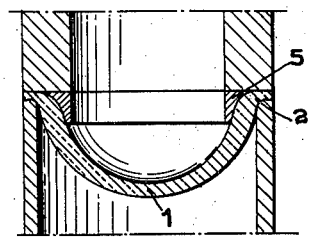

Figs. 1, 2, and 3 are axial sections each showing a distinct form of construction.

In the example of Fig. 1, the wall 1, in the shape of a spherical cap, has a ledge 2, the general shape and relative dimensions of which are substantially those of known walls. This edge is adapted to be firmly clamped between two annular members 3 and 4. According to the invention, a portion of the edge 2 is constituted by a resistant filling of as little expansibility as possible or at least scarcely more expansible than the material constituting the members 3 and 4.

In the example illustrated, this filling is constituted by a ring 5 formed of layers of fabric or of a cotton braid impregnated with gum and secured to ledge 2 by vulcanization. The shape of the cross section of the filling member is so chosen as to provide at the center of the portion subjected to the clamping action of members 3 and 4, a mass of rubber as reduced as possible for preserving suitable fluid-tightness.

In the example of Fig. 2, the filling member is constituted by a steel ring 5 having an inner edge 5ª deeply inserted in the mass of the rubber. The important surface of contact between the ring 5 and the rubber is, on the steel, covered with brass, so as to ensure, upon vulcanization, a perfect adherence between the metal and the gum.

In the example of Fig. 3, the filling member is also constituted by a steel ring 2 secured to the rubber in the same way as for the form of construction of Fig. 2, but the ring 5 is arranged internally to the concavity of cap 1.

The three examples which have just been described are sufficient for allowing the nature and scope of the invention to be clearly understood. Said invention has been defined above in its principle and includes in its scope all means and combinations of means allowing this principle to be carried out.

What I claim as my invention and desire to secure by Letters Patent is:—

1. A flexible diaphragm subjected to important variations of temperature, comprising a rubber wall the thickness of which, at the periphery, is only a small fraction of the thickness of the remainder, and a peripheral packing firmly adhering to the peripheral portion of small thickness of the rubber wall, said packing being composed of a material very slightly expanding under the effect of the temperature.

2. A flexible diaphragm subjected to important variations of temperature, comprising a rubber wall the thickness of which, at the periphery, is only a small fraction of the thickness of the remainder, and a peripheral metal packing firmly adhering to the peripheral portion of small thickness of the rubber wall, the metal having a small coefficient of expansion.

3. A rubber diaphragm in the shape of a cap, a rigid and slightly expansible ring having an L cross section and a branch of which is parallel to the geometrical axis of the cap and the other at right angles to this axis and directed towards the same, the rubber of the cap firmly adhering to the inner faces of said ring and terminating in a portion of small thickness for receiving one of the outer faces of the ring at right angles to the geometrical axis of the cap.

LOUIS CHARLES BRISSON.